United States Patent
Kim et al.

(10) Patent No.: US 9,571,171 B2
(45) Date of Patent: Feb. 14, 2017

(54) APPARATUS AND METHOD FOR ADAPTIVE BEAM-FORMING IN WIRELESS COMMUNICATION SYSTEM

(71) Applicant: Samsung Electronics Co., Ltd., Suwon-si, Gyeonggi-do (KR)

(72) Inventors: Tae-Young Kim, Seongnam-si (KR); Hyun-Kyu Yu, Yongin-si (KR); Jae-Weon Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 14/066,021

(22) Filed: Oct. 29, 2013

(65) Prior Publication Data

US 2014/0056256 A1 Feb. 27, 2014

Related U.S. Application Data

(63) Continuation of application No. 13/302,182, filed on Nov. 22, 2011, now Pat. No. 8,594,053.

(30) Foreign Application Priority Data

Aug. 12, 2011 (KR) ........................ 10-2011-0080676

(51) Int. Cl.
*H04W 4/00* (2009.01)
*H04B 7/04* (2006.01)
(Continued)

(52) U.S. Cl.
CPC ......... *H04B 7/0408* (2013.01); *H04W 72/046* (2013.01); *H04L 1/1867* (2013.01)

(58) Field of Classification Search
CPC ... H04B 7/0408; H04W 72/046; H04L 1/1867
See application file for complete search history.

(56) References Cited

U.S. PATENT DOCUMENTS 5,894,598 A 4/1999 Shoki
6,512,480 B1 1/2003 Reudink
(Continued)

FOREIGN PATENT DOCUMENTS

| CN | 101563860 A | 10/2009 |
|---|---|---|
| CN | 101689901 A | 3/2010 |

(Continued)

*Primary Examiner* — Clemence Han
(74) *Attorney, Agent, or Firm* — Jefferson IP Law, LLP

(57) ABSTRACT

Apparatuses and methods for maintaining an optimal beam direction in a wireless communication system are provided. The method for operating a receiving node in a wireless communication system includes, determining a first transmission beam is determined as a preferred transmission beam using a plurality of reference signals transmitted by a transmitting node, generating preferred transmission beam information, transmitting the preferred transmission beam information to the transmitting node, receiving transmissions from the transmitting node via the first transmission beam, and determining whether a change of a transmission beam is necessary. When the change of the transmission beam is determined to be necessary, generating a beam change request and transmitting the beam change request to the transmitting node.

20 Claims, 9 Drawing Sheets

(51) Int. Cl.
*H04W 72/04* (2009.01)
*H04L 1/18* (2006.01)

(56) References Cited

U.S. PATENT DOCUMENTS

| | | | |
|---|---|---|---|
| 7,974,236 B2 | 7/2011 | Woo | |
| 2004/0214606 A1 | 10/2004 | Wichman et al. | |
| 2005/0197162 A1* | 9/2005 | Fujishima et al. | 455/562.1 |
| 2006/0063492 A1 | 3/2006 | Iacono et al. | |
| 2008/0008110 A1* | 1/2008 | Kishigami et al. | 370/310 |
| 2008/0144737 A1 | 6/2008 | Naguib | |
| 2009/0262035 A1 | 10/2009 | Gonikberg | |
| 2009/0273520 A1* | 11/2009 | Shao | H04W 16/28 342/417 |
| 2010/0178884 A1 | 7/2010 | Nassiri-Toussi et al. | |
| 2010/0267341 A1* | 10/2010 | Bergel et al. | 455/63.1 |
| 2011/0110453 A1* | 5/2011 | Prasad | H04B 7/0695 375/285 |
| 2011/0143807 A1 | 6/2011 | Aue et al. | |
| 2012/0082200 A1* | 4/2012 | Verikoukis et al. | 375/227 |
| 2012/0087400 A1* | 4/2012 | Kim et al. | 375/219 |
| 2014/0098903 A1 | 4/2014 | Hoshino et al. | |
| 2015/0282153 A1 | 10/2015 | Takano et al. | |

FOREIGN PATENT DOCUMENTS

| | | |
|---|---|---|
| CN | 101755393 A | 6/2010 |
| CN | 101807949 A | 8/2010 |
| EP | 2 023 502 A1 | 2/2009 |
| EP | 2 334 122 A1 | 6/2011 |
| JP | 3441256 B2 | 8/2003 |
| JP | 2011-82876 A | 4/2011 |
| WO | 2007/105999 A1 | 9/2007 |
| WO | 2009/004768 A1 | 1/2009 |
| WO | 2009/037580 A2 | 3/2009 |
| WO | 2009/134019 A2 | 11/2009 |
| WO | 2010/122432 A1 | 10/2010 |
| WO | 2011/002132 A1 | 1/2011 |

* cited by examiner

APPARATUS AND METHOD FOR ADAPTIVE BEAM-FORMING IN WIRELESS COMMUNICATION SYSTEM

CROSS-REFERENCE TO RELATED APPLICATION(S)

This application is a continuation of prior application Ser. No. 13/302,182, filed on Nov. 22, 2011, which claimed the benefit under 35 U.S.C §119 (a) of a Korean patent application filed on Aug. 12, 2011 in the Korean Intellectual Property Office and assigned Serial No. 10-2011-0080676, the entire disclosure of which is hereby incorporated by reference.

BACKGROUND OF THE INVENTION

1. Field of the Invention

The present invention relates to a wireless communication system. More particularly, the present invention relates to an apparatus and a method for adaptively performing beam forming in a wireless communication system that uses a Super High Frequency (SHF) band.

2. Description of the Related Art

To meet continually increasing Radio Frequency (RF) data traffic demands, wireless communication systems are evolving so as to support higher data transmission rates. For example, an emphasis in the development of a 4th Generation (4G) wireless communication system is an improvement in spectral efficiency in order to increase a data transmission rate. However, it has become difficult to meet the continually increasing RF data traffic demands with only improvements in the spectral efficiency.

The above problem may alternatively be addressed by employing a wider frequency band. A frequency band used by a mobile communication system of the related art is typically 10 GHz or less. The reason for this is that it is very difficult to secure a wider frequency band at 10 GHz or less. However, a wider frequency band may be more easily secured in a super high frequency band (e.g., 30 GHz through 150 GHz). The super high frequency band may also be referred to as the millimeter (mm) wave band.

However, the use of the super high frequency band has a shortcoming in that as a frequency for wireless communication increases, a radio path loss increases. Accordingly, as the frequency for wireless communication increases, radio reach distance is correspondingly shortened, thereby resulting in a reduced service coverage area. However, there is a technique to address this shortcoming, namely beam-forming. Beam-forming addresses the radio path loss and increases the radio reach distance.

Beam-forming may be classified into a transmission beam-forming and a reception beam-forming. The transmission beam-forming concentrates a reach region of a radio wave in a specific direction. The reach region of a radio wave may be concentrated in a specific direction using a plurality of antennas. Generally, a structure including the plurality of antennas is referred to as an antenna array, and an individual antenna included in the antenna array is referred to as an array element. In a case where transmission beam-forming is applied, a transmission distance of a signal increases in an intended direction, and simultaneously, the transmission distance of the signal in directions other than the intended direction are minimized. Therefore, interference to other users located in directions other than the intended direction is reduced. In the reception beam-forming, a reception side concentrates reception of radio waves from a specific direction using a reception antenna array. Accordingly, strength of a signal received from an intended direction increases, and strength of a signal received from directions other than the intended direction are excluded, so that an interference signal from a direction other than the indented direction is effectively blocked.

As described above, in order to secure a wider frequency band, utilization of a super high frequency band, that is, a millimeter (mm) wave band, is expected. In this case, beam-forming may be employed to overcome a radio path loss. Therefore, techniques are desired for effectively performing beam-forming in a mobile communication environment where a user moves and a radio environment changes.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for effectively performing beam-forming in a wireless communication system.

Another aspect of the present invention is to provide an apparatus and a method for overcoming a limitation of a periodic beam obtaining procedure in a wireless communication system.

Still another aspect of the present invention is to provide an apparatus and a method for performing a beam changing procedure in response to a beam selection error in a wireless communication system.

Yet another aspect of the present invention is to provide an apparatus and a method for detecting an occurrence of a beam selection error using a reference signal other than a reference signal for a beam obtaining procedure in a wireless communication system.

Still another aspect of the present invention is to provide an apparatus and a method for reselecting a preferred beam using a reference signal other than a reference signal used for a beam obtaining procedure in a wireless communication system.

In accordance with an aspect of the present invention, a method for operating a receiving node in a wireless communication system is provided. The method includes determining a first transmission beam as a preferred transmission beam using a plurality of reference signals transmitted by a transmitting node, generating preferred transmission beam information, transmitting the preferred transmission beam information to the transmitting node, receiving transmissions from the transmitting node via the first transmission beam, determining whether a change of a transmission beam is necessary, and when the change of the transmission beam is determined to be necessary, generating a beam change request, and transmitting the beam change request to the transmitting node.

In accordance with another aspect of the present invention, a method for operating a transmitting node in a wireless communication system is provided. The method includes transmitting a plurality of reference signals through corresponding transmission beams, receiving preferred transmission beam information from a receiving node, which was generated by the receiving node based on the reference signals, identifying a first transmission beam as a transmission beam for transmitting a signal to the receiving node based on the preferred transmission beam information, transmitting the signal to the receiving node via the first transmission beam, receiving a beam change request from the receiving node, identifying a second transmission beam as the transmission beam for transmitting the signal to the receiving node, and one of adding and changing the second transmission beam as the transmission beam used for transmitting the signal to the receiving node.

In accordance with further another aspect of the present invention, a receiving node in a wireless communication system is provided. The receiving node includes a controller for controlling a transmitter and a receiver, for determining a first transmission beam as a preferred transmission beam using a plurality of reference signals transmitted by a transmitting node, for generating preferred transmission beam information, for controlling to transmit the preferred transmission beam information to the transmitting node, for controlling to receive transmissions from the transmitting node via the first transmission beam, for determining whether a change of a transmission beam is necessary, and when the change of the transmission beam is determined to be necessary, for generating a beam change request and for controlling to transmit the beam change request to the transmitting node; the transmitter for transmitting the preferred transmission beam information and the beam change request to the transmitting node; and the receiver for receiving the transmissions from the transmitting node.

In accordance with further yet another aspect of the present invention, a transmitting node in a wireless communication system is provided. The transmitting node includes a beam-forming unit for applying one or more transmission beams for the transmission of a plurality of reference signals to a receiving node and the transmission of a signal to the receiving node, a receiver for receiving preferred transmission beam information and a beam change request from the receiving node, and a controller for controlling the beam-forming unit and the receiver, for controlling to transmit the plurality of reference signals through corresponding transmission beams, for controlling to receive the preferred transmission beam information from the receiving node, which was generated by the receiving node based on the reference signals, for identifying a first transmission beam as a transmission beam for transmitting the signal to the receiving node based on the preferred transmission beam information, for controlling to transmit the signal to the receiving node via the first transmission beam, for controlling to receive the beam change request from the receiving node, for identifying a second transmission beam as the transmission beam for transmitting the signal to the receiving node, and for one of adding and changing the second transmission beam as the transmission beam used for transmitting the signal to the receiving node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technology for effectively performing beam-forming under a mobile communication environment in a wireless communication system. Hereinafter, exemplary embodiments of the present invention are described using an Orthogonal Frequency Division Multiplexing (OFDM)/Orthogonal Frequency Division Multiple Access (OFDMA) wireless communication system as an example. However, the present invention is not limited thereto. Exemplary embodiments of the present invention may be implemented in a wireless communication system that uses a Super High Frequency (SHF) band. However, the present invention is not limited thereto. Exemplary embodiments of the present invention are applicable to wireless communications between any two nodes in either direction (i.e., wireless communications from a transmitting node to a receiving node). Examples of the nodes include, base stations, terminals, relay stations, etc. For convenience in explanation, exemplary embodiments of the present invention are described herein in the context of beam forming for transmissions from a base station (as a transmitting node) to a terminal (as a receiving node). However, as described above, the present invention is not limited thereto.

Figure 1:
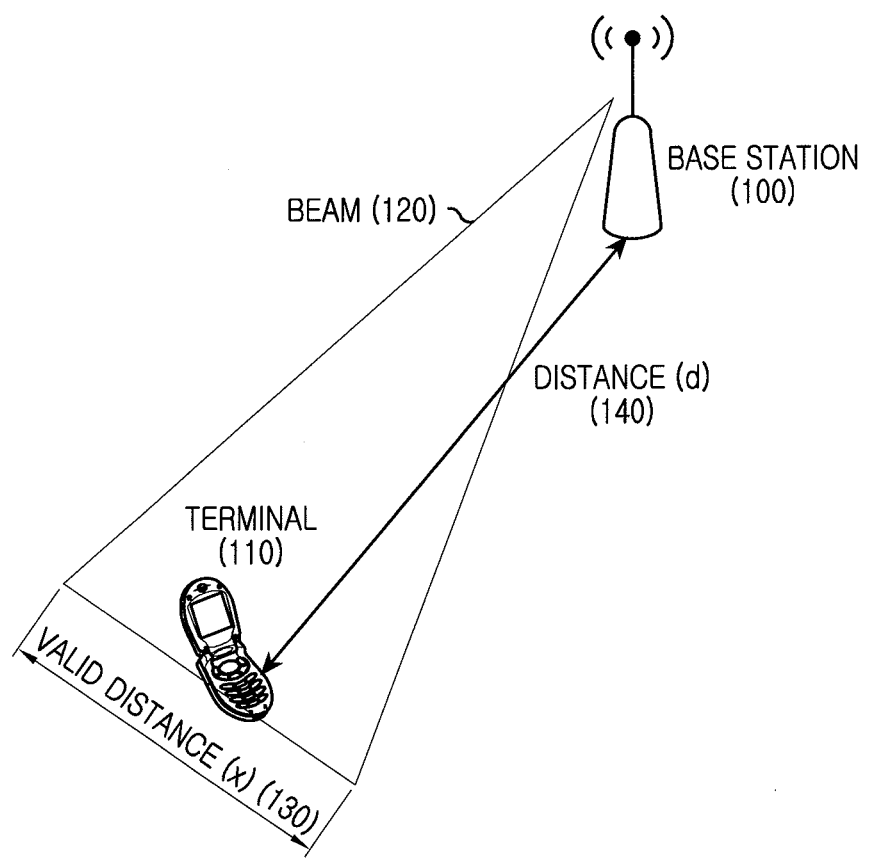
FIG. 1 is a view illustrating a beam region depending on a base station and a terminal in a wireless communication system according to an exemplary embodiment of the present invention.

FIG. 1 is a view illustrating a beam region depending on a base station and a terminal in a wireless communication system according to an exemplary embodiment of the present invention.

Referring to FIG. 1, a beam 120 is formed when a base station 100 performs beam-forming to communicate with a terminal 110. The beam 120 is a region in which the terminal 110 may effectively receive a beam-formed signal. The beam 120 may have a beam width that defines boundaries of the beam 120 and that extend from the base station 100. The beam width may be a 3 dB-beam width in which the boundaries that extend from the base station 100 correspond to locations at which the signal strength of the beam-formed signal has decreased by 3 dB. The beam width may be defined in degrees. A valid distance x 130 of beam 120 depends on a distance d 140 between the base station 100 and the terminal 110, and the beam width. The valid distance x 130 is a distance of a perpendicular cross section of the beam 120. The valid distance x 130 may be used to determine the validity of an operational period between beam obtain procedures for the beam 120 in the case where the terminal 110 moves. The beam obtain procedure is performed periodically and each iteration of the beam obtain procedure is used to select and apply the beam 120 for a terminal 100. To be effective, the operational period should be long enough such that a selected beam 120 continues to be the preferred beam despite movement of the terminal 100.

For a given beam width, the valid distance x 130 is shortened as the distance d 140 from the base station 100 is reduced. Also, for a given distance d 140 from the base station 100, the valid distance x 130 is shortened as the beam width narrows. For example, in the case where the 3 dB-beam width is 10° or 20°, when a movement velocity of the terminal 110 is uniform, the valid distance x 130 of the beam 120 may be calculated depending on the distance d 140 between the base station 100 and the terminal 110. In addition, when the valid distance x 130 is calculated, a time consumed for the terminal 110 to move a distance corresponding to the valid distance x 130 may be calculated depending on a movement velocity of the terminal 110. Table 1 shows results obtained by calculating consumption time for moving a distance corresponding to the valid distance x 130 depending on a movement velocity of the terminal 110, a valid distance x 130, and a distance d 140 between the base station 100 and the terminal 110. In Table 1, it is assumed that a frequency band is 28 GHz.

TABLE 1

| | | Time duration | |
|---|---|---|---|
| Distance (d) | Width (x) | 30 km/h | 120 km/h |
| 50 m | 4.3~17.6 m | 0.5~2 sec | 0.13~0.52 sec |
| 100 m | 8.7~35.2 m | 1~4 sec | 0.26~1 sec |

As illustrated in Table 1, even when the terminal 110 moves at a high velocity of 120 km/h or more, hundreds of msec are consumed at the minimum for the terminal 110 to move a distance corresponding to the valid distance x 130. Considering that a section of one frame of a communication system is typically designed to be 10 msec or less, a consumption time of hundreds of msec is a relatively long time. In addition, hundreds of msec is a relatively long time, considering a retransmission period of a Hybrid Automatic Repeat reQuest (HARQ) technique which performs retransmission by adaptively considering a channel change. That is, since a rate of change in a preferred beam due to movement of the terminal 110 is slower than a rate of change in a channel, it is suitable that, with respect to system overhead and efficiency, a beam obtain procedure period is longer than an HARQ retransmission period.

When beam-forming is performed, a beam selection error may occur. Beam selection error denotes not only a case where a beam is erroneously selected in a beam obtain procedure but also a case where a beam selected in the previous beam obtain procedure and a currently preferred beam are different from each other due to movement of a terminal and/or a neighbor environment change. Here, the preferred beam denotes a beam having a greatest likelihood of providing a sufficient communication quality or a beam having a greatest likelihood of providing a communication quality greater than or equal to a threshold. The communication quality may correspond to at least one of signal strength, channel quality, etc. The at least one of signal strength, channel quality, etc. may be determined using at least one of Received Signal Strength Indication (RSSI), a Signal to Interference-plus-Noise Ratio (SINR), a Signal-to-Noise Ratio (SNR), a Carrier to Interference-plus-Noise Ratio (CINR), a Carrier to Interference Ratio (CIR), a Bit Error Rate (BER), etc. When the beam selection error occurs, an antenna gain is reduced, thereby potentially resulting in a reduced received signal strength and a deterioration in communication quality.

The consumption time for a terminal to move a distance corresponding to the valid distance described with reference to FIG. 1 denotes a time for a case in which a terminal moves from one boundary of the same beam region to the opposite boundary. However, since a terminal does not always move from one boundary of the same beam region to the opposite boundary, the consumption time shown in Table 1 represents a maximum value. Therefore, in the case where the terminal moves from one beam region to another beam region, crossing over a boundary there between, the consumption time may be shorter.

Figure 2:
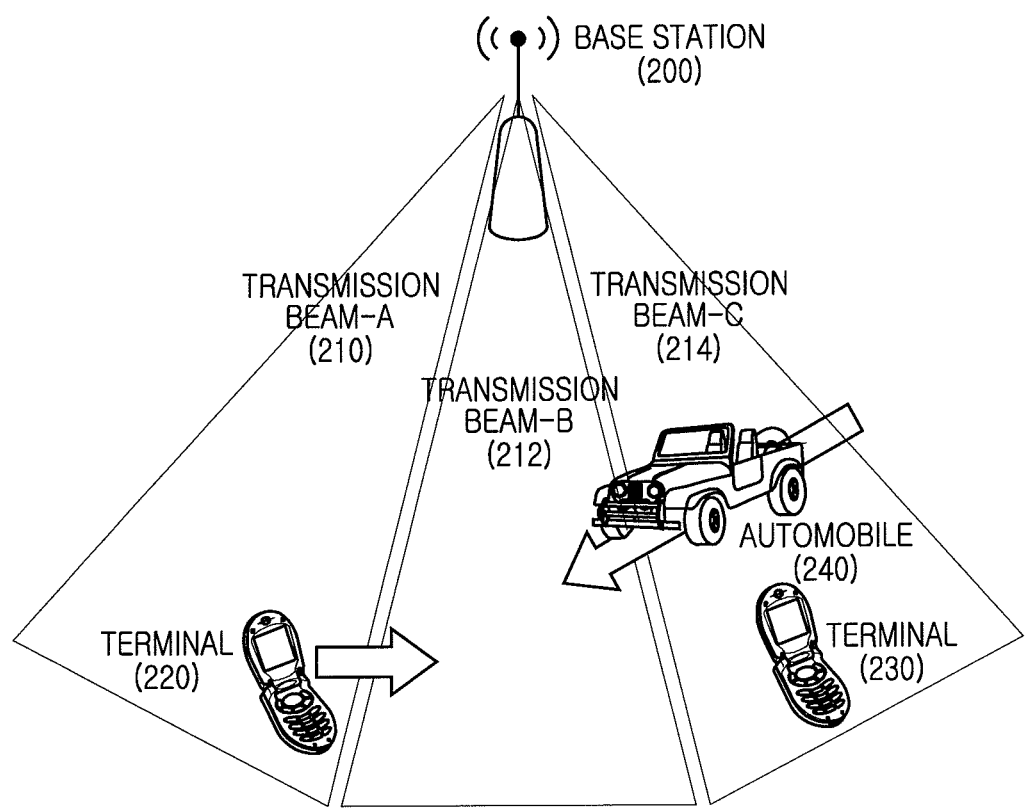
FIG. 2 is a view illustrating an example where a beam selection error occurs in a wireless communication system according to an exemplary embodiment of the present invention.

FIG. 2 is a view illustrating an example where a beam selection error occurs in a wireless communication system according to an exemplary embodiment of the present invention.

Referring to FIG. 2, when a terminal 220 located near a boundary of a transmission beam-A 210 moves toward a transmission beam-B 212, a beam preferred by the terminal 220 may change before an operational period of the beam obtain procedure elapses, even when the velocity of the terminal 220 is low. As a result, a beam selection error may occur. Here, it is assumed that the beam obtain procedure has a longer period than an HARQ retransmission period, as discussed above with reference to FIG. 1.

The beam selection error may also result from neighboring environment changes, and not a terminal's movement. That is, even though the terminal does not leave a beam region, a preferred beam direction may change before the beam obtain procedure period elapses due to an obstacle existing in the neighborhood, for example, an automobile, a building, etc. For example, as illustrated in FIG. 2, when the terminal 230 remains at a fix location within a transmission beam-C 214 and an automobile 240 enters a Line of Sight (LOS) path of the terminal 230 and the base station 200, a beam preferred by the terminal 230 may change. This assumes that the terminal 230 may favor a Non-LOS (NLOS), that is, a direction of a beam reflected by a reflecting body and propagating, as well as a beam of an LOS direction.

As described above, a beam selection error may occur in various cases. An intuitive and simple technique to address the beam selection error is to define a very short beam obtain procedure period. However, as the beam obtain procedure period gets shorter, a frequency of beam obtain procedures increases, resulting in an increased number of unnecessary beam obtain procedures, and simultaneously, system overhead increases due to uplink feedback for the beam obtain procedures. In addition, due to an increase in a frequency of beam obtain procedures, power consumption of the terminal may increase. Therefore, an exemplary embodiment of the present invention proposes an alternative for effectively addressing a beam selection error without simply shortening the beam obtain procedure period.

Figure 3:
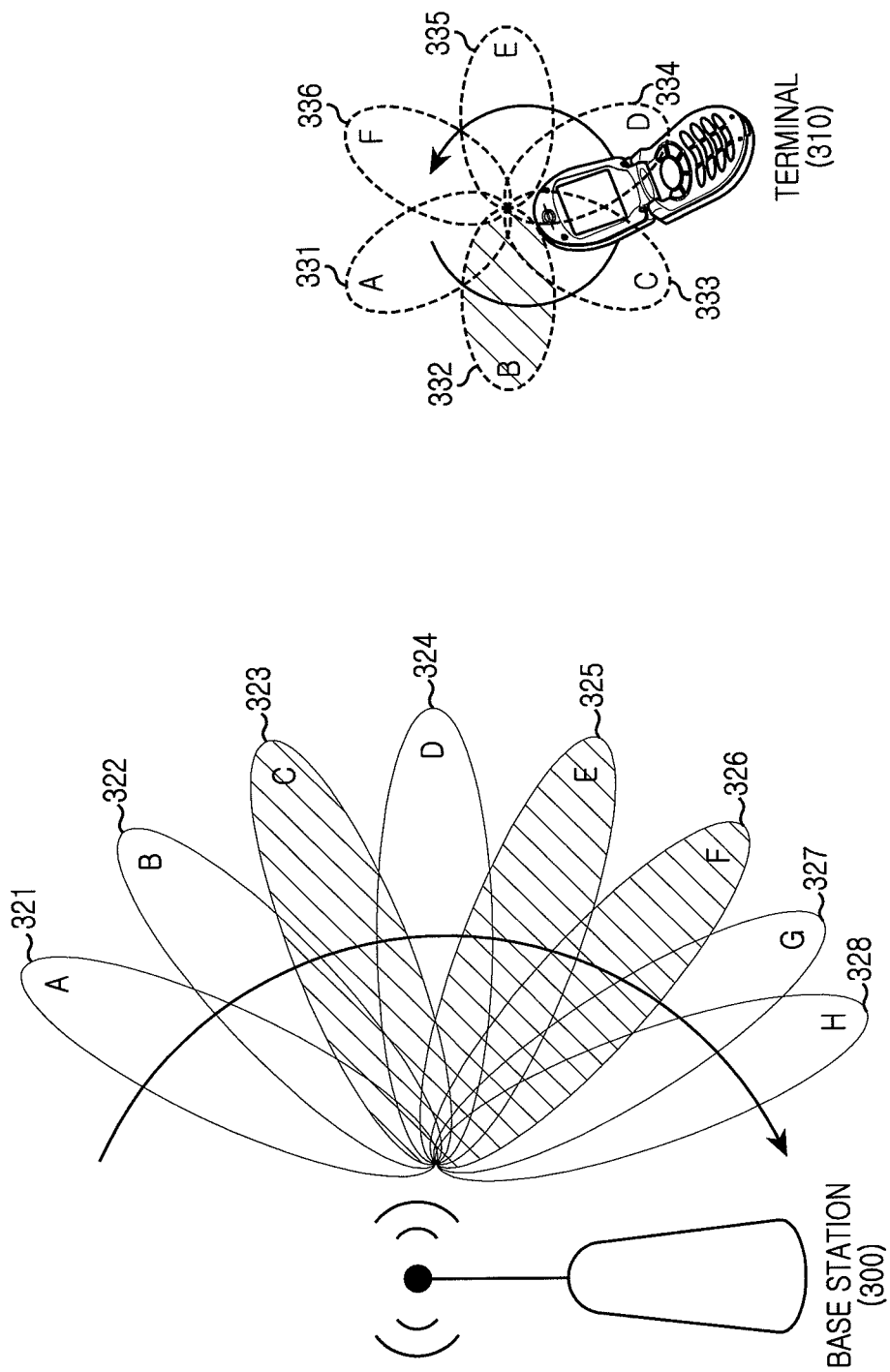
FIG. 3 is a view illustrating an example of preferred beam determination in a wireless communication system according to an exemplary embodiment of the present invention.

FIG. 3 is a view illustrating an example of preferred beam determination in a wireless communication system according to an exemplary embodiment of the present invention.

Referring to FIG. 3, a base station 300 sequentially transmits a plurality of reference signals in corresponding transmission beam directions in order to determine which beam to use to transmit to terminal 310. Here, the reference signals are signals configured in a predetermined sequence, and may be denoted by a preamble, a midamble, a training signal, etc. The terminal 310 receives the reference signals transmitted in the different beam directions and measures a signal strength with respect to each reference signal. The signal strength may correspond to one of RSSI, SINR, SNR, CINR, CIR, BER, etc. The signal strength may be replaced by a channel quality, etc. The terminal 310 compares the measured signal strengths and then selects a transmission beam having a strongest signal strength. Through this process, an optimal transmission beam is determined.

In addition, the terminal 310 may determine an optimal reception beam. In a case of determining the optimal reception beam, a reference signal should be repeatedly transmitted a number of times corresponding to a product of the number of transmission beams of the base station 300 and the number of reception beams of the terminal 310. That is, the terminal 310 changes a reception beam with respect to a reference signal to which a determined transmission beam has been applied to repeatedly receive a reception beam, measures signal strengths corresponding to respective reception beams, and then selects a reception beam having a strongest signal strength. Through the above-described reception signal strength measurement and comparison, a preferred transmission/reception beam pair may be determined. For example, in the case of FIG. 3, an exemplary embodiment of the present invention assumes that a transmission beam-E 325 and a reception beam-B 332 have been selected as a preferred transmission/reception beam pair having the strongest signal strength.

When the transmission beam-E 325 and the reception beam-B 332 are selected as optimal transmission/reception beams, the terminal 310 feeds back information to the to the base station 300 to inform the base station 300 that the transmission beam-E 325 is a preferred transmission beam. After that, in the case where the preferred transmission/reception beam pair changes, that is, where a beam selection error occurs during data transmission or before the next beam obtain procedure is performed, the terminal 310 should reselect a preferred transmission/reception beam pair, and inform the base station of the reselected transmission beam. However, the terminal 310 is not certain whether the base station 300 will immediately apply the reselected transmission beam, and reselection of a reception beam corresponding to the reselected transmission beam is still required. Therefore, to address the uncertainty of whether the reselected transmission beam is applied and the necessity of the reception beam reselection, an additional control signal exchange is required. Therefore, the base station 300 and the terminal 310 may clearly determine whether to apply the reselected transmission beam and reselect a reception beam corresponding to the reselected transmission beam through the exchange of the additional control signal.

Additionally, a technique is provided herein for reducing a signaling overhead by removing the exchange of the additional control signal according to an exemplary embodiment of the present invention. An alternative to removing the exchange of the additional control signal is to reselect a transmission beam in the range in which preference of a reception beam is maintained. Generally, a reception beam of the terminal 310 has a wider beam width than a transmission beam of the base station 300. Therefore, with respect to one preferred reception beam, a plurality of preferred transmission beams may exist. In other words, a relationship between a reception beam and a transmission beam may be 1: plurality. For example, in the case of FIG. 3, an exemplary embodiment of the present invention assumes that a correspondence relationship between a reception beam and a transmission beam is illustrated in Table 2.

TABLE 2

| Tx beam | RX beam |
| --- | --- |
| A | A |
| B | F |
| C | B |
| D | A |
| E | B |
| F | B |
| G | C |
| H | C |

As shown in Table 2, the terminal 310 prefers a transmission beam-A 321 and a transmission beam-D 324 with respect to a reception beam-A 331, prefers a transmission beam-C 323, a transmission beam-E 325 and a transmission beam-F 326 with respect to a reception beam-B 332, prefers a transmission beam-G 327 and transmission beam-H 328 with respect to a reception beam-C 333, and prefers a transmission beam-B 322 with respect to a reception beam-F 336. Herein, the terminal 310 does not prefer any transmission beam with respect to reception beam-D 334 and reception beam-E 335.

During a beam obtain procedure, the terminal 310 determines a reception beam having a strongest signal strength for each transmission beam to generate a transmission/reception beam pair list. For example, the transmission/reception beam pair list may be the list shown in Table 2. Accordingly, when the terminal 310 then determines that a beam selection error occurs, the terminal 310 selects a beam pair having a strongest signal strength from the transmission/reception beam pairs including the reception beam currently in use. In addition, the terminal 310 feeds back information to the base station 300 to inform the base station 300 of a transmission beam included in the selected beam pair as reselected transmission beam information. In this case, since the reception beam does not change, it does not matter in the operation of the terminal 310 whether the reselected transmission beam is applied because reselection of the reception beam is not required.

A description is made below using a specific example with reference to FIG. 3. An optimal transmission/reception beam pair determined via a beam obtain procedure in FIG. 3 is a transmission beam-E 325 and a reception beam-B 332. At this point, during the beam obtain procedure, the terminal 310 generates and stores a transmission/reception beam pair list. After that, the terminal 310 detects the occurrence of a beam selection error using reference signals transmitted for a different purpose or a beam obtain procedure of a different terminal. That is, the terminal 310 may use signals transmitted from the base station 300 for a purpose other than the beam obtain procedure as the reference signals or a the terminal may use reference signals intended for a beam obtain procedure for a terminal other than the terminal 310. In the case of using reference signals for a different purpose or the beam obtain procedure for a different terminal, the terminal 310 may receive at least one reference signal every frame.

An exemplary process of detecting a beam selection error is described below in more detail. The terminal 310 newly generates a transmission/reception beam pair list using the reference signals, and searches for a beam pair having a strongest signal strength among transmission/reception beam pairs including the reception beam-B 323. When a beam pair is found, which includes the reception beam-B 323 and has the strongest signal strength, that is different from the transmission/reception beam pair determined via the beam obtain procedure, the terminal 310 determines that a beam selection error occurs. In this case, the terminal 310 feeds back information to the base station 300 representing a transmission beam included in the beam pair, which includes the reception beam-B 323, that is found to have the strongest signal strength, as information for a reselected transmission beam. Through this, the terminal 310 may receive a signal of the base station 300 without needing to determine whether a reselected transmission beam has been applied and without having to reselect a reception beam.

For another example, the terminal 310 does not newly generate a transmission/reception beam pair list, but may still determine whether the beam selection error occurs. Specifically, in a case where a preferred reception beam is applied, the terminal 310 selects a transmission beam that maximizes reception signal strength, and determines whether the transmission beam is the same as the transmission beam determined via the beam obtain procedure, thereby determining whether the beam selection error occurs. Here, when selecting the transmission beam that maximizes the reception signal strength, the terminal 310 may select any transmission beam. Alternatively, when selecting the transmission beam that maximizes the reception signal strength, the terminal 310 may limit its selection to those transmission beams that correspond to the preferred reception beam in the transmission/reception beam pair list. In addition, in a case where the preferred reception beam is applied, the terminal 310 feeds back information to the base station 300 representing the transmission beam that maximizes reception signal strength.

During the process of determining a beam selection error, when the transmission beam that maximizes reception signal strength is different from the transmission beam determined via the beam obtain procedure, the terminal 310 determines the beam selection error. However, according to another exemplary embodiment of the present invention, a first additional condition may need to be met for the terminal 310 to determine that a beam selection error occurs. The first additional condition is that the signal strength of the transmission beam determined via the beam obtain procedure is less than a first threshold. For example, when the signal strength of the transmission beam determined via the beam obtain procedure is greater than or equal to the first threshold, despite the reselected transmission beam that maximizes the reception signal strength being different from the transmission beam determined via the beam obtain procedure, the terminal 310 may determine that a beam selection error has not occurred. In another example, when the signal strength of the transmission beam determined via the beam obtain procedure is less than the first threshold, and the reselected transmission beam is different from the transmission beam determined via the beam obtain procedure, the terminal 310 may determine that a beam selection error has occurred.

Instead of or in addition to the first additional condition described above, a second condition may need to be met for the terminal 310 to determine that a beam selection error occurs. The second additional condition is that the difference between signal strength of the reselected transmission beam and the signal strength of the transmission beam determined via the beam obtain procedure is greater than a second threshold. For example, when the difference between the signal strength of the reselected transmission beam and the signal strength of the transmission beam determined via the beam obtain procedure is less than or equal to the second threshold, despite the reselected transmission beam that maximizes the reception signal strength being different from the transmission beam determined via the beam obtain procedure, the terminal 310 may determine that a beam selection error has not occurred. In another example, when the difference between signal strength of the reselected transmission beam and the signal strength of the transmission beam determined via the beam obtain procedure is greater than the second threshold, and the reselected transmission beam is different from the transmission beam determined via the beam obtain procedure, the terminal 310 may determine that a beam selection error has occurred.

As described above, the base station and the terminal according to an exemplary embodiment of the present invention perform a beam obtain procedure using a reference signal according to a predetermined period, and simultaneously, may address a beam change that may occur temporarily or irregularly via a beam change procedure performed when a beam selection error occurs.

Figure 4:
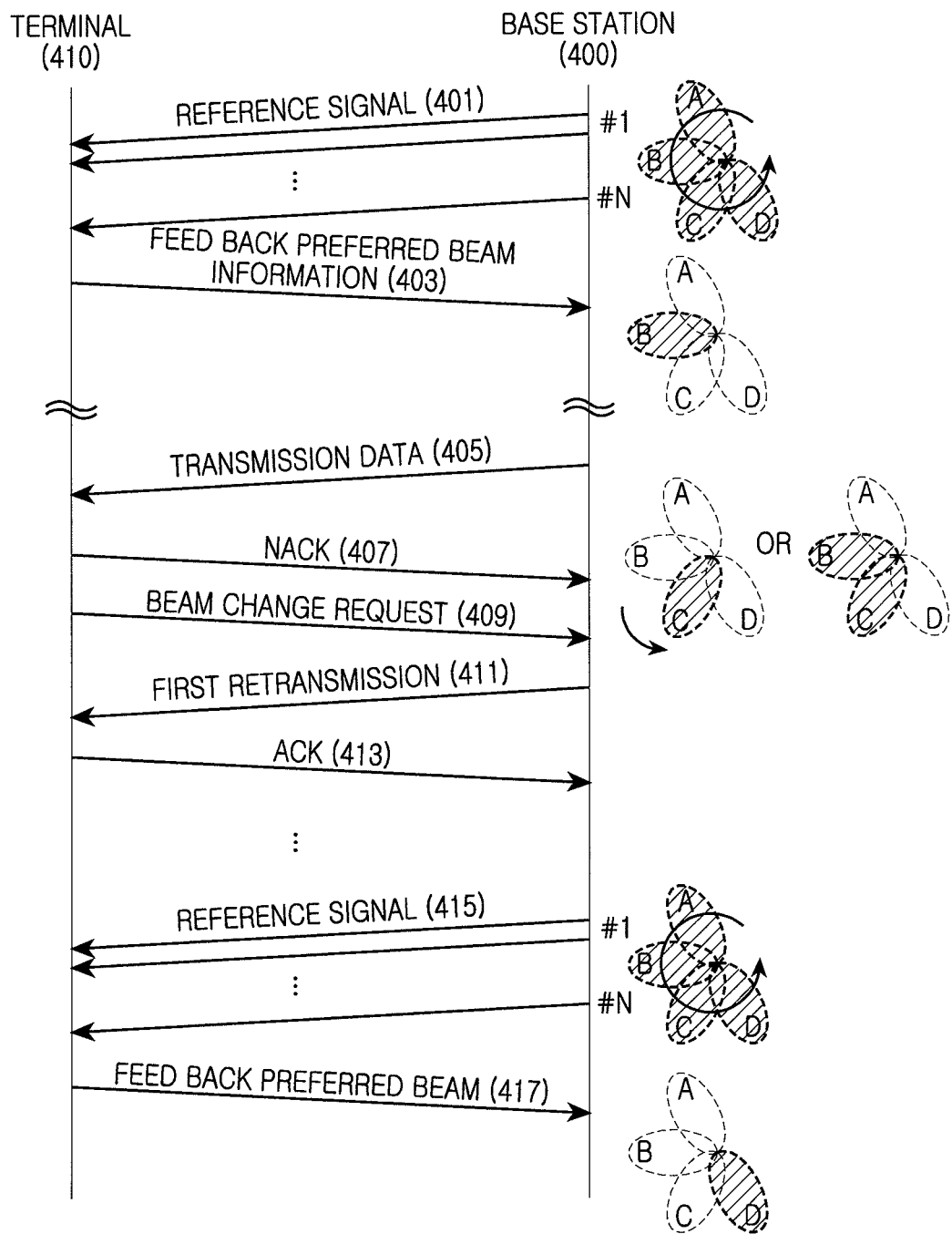
FIG. 4 is a view illustrating signaling for a beam obtain procedure and a beam change procedure in a wireless communication system according to an exemplary embodiment of the present invention.
Figure 5:
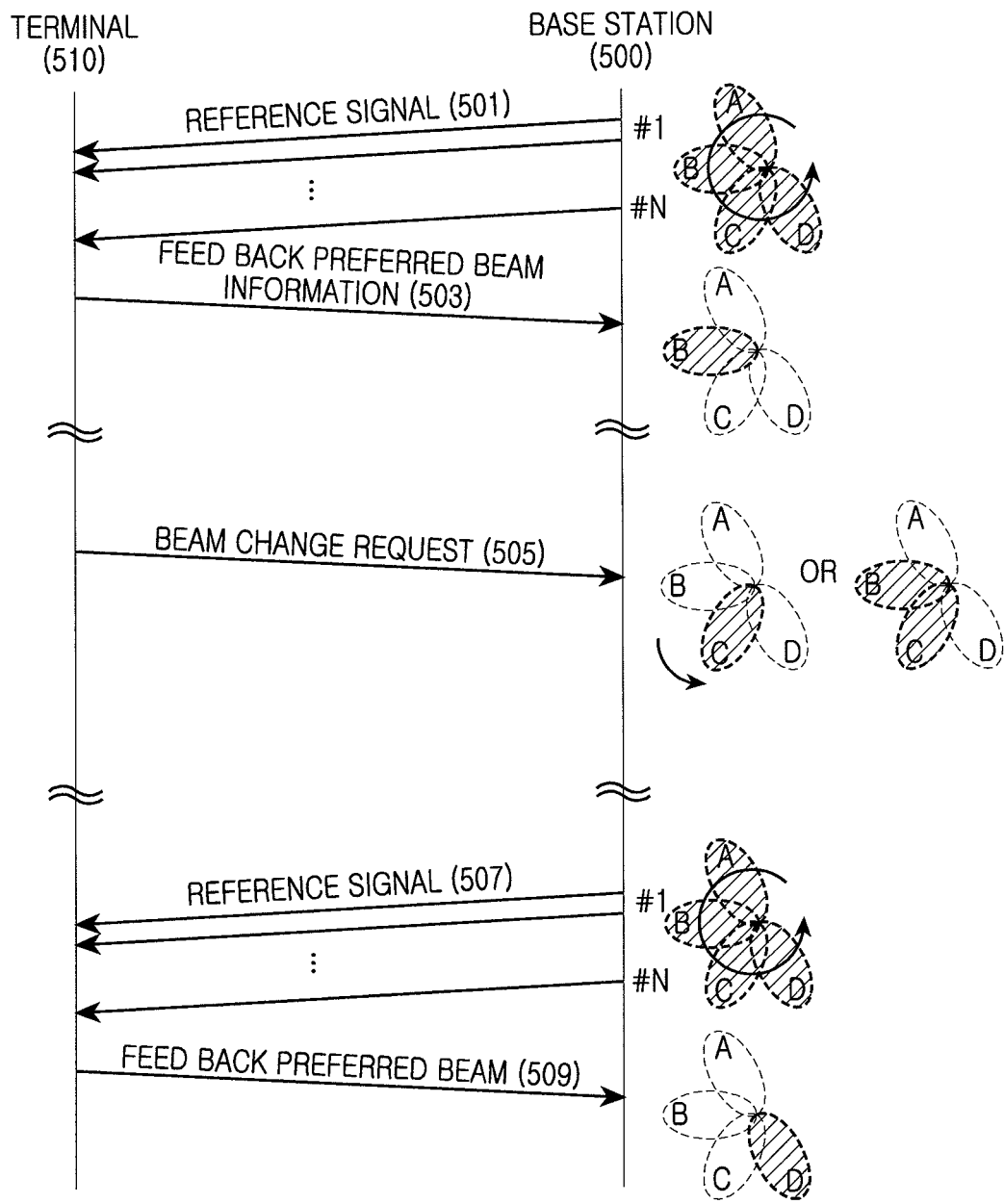
FIG. 5 is a view illustrating signaling for a beam obtain procedure and a beam change procedure in a wireless communication system according to an exemplary embodiment of the present invention.

A case where the above-described beam obtain procedure and beam change procedure are performed according to an exemplary embodiment of the present invention is described below. For example, a beam change procedure according to an exemplary embodiment of the present invention may be performed when a beam selection error occurs or when an HARQ initial transmission or retransmission fails and simultaneously a beam selection error occurs. FIG. 4 illustrates an exemplary embodiment that includes the HARQ transmission failure and the beam selection error occurrence as a condition for performing the beam change procedure, and FIG. 5 illustrates an exemplary embodiment that includes a beam selection error occurrence as a condition for performing the beam change procedure.

FIG. 4 is a view illustrating signaling for a beam obtain procedure and a beam change procedure in a wireless communication system according to an exemplary embodiment of the present invention.

Referring to FIG. 4, a beam obtain procedure is performed in steps 401 and 403. In step 401, a base station 400 sequentially transmits reference signals that apply different transmission beams, and a terminal 410 applies different reception beams to receive the reference signals. That is, the base station 400 repeatedly transmits a plurality of reference signals while changing beam directions by the number of transmission/reception beams. Herein, there are alternative implementations for step 403 of the beam obtain procedure.

In a first alternative for step 403, the terminal 410 selects a preferred beam using the reference signals and feeds back information of the preferred beam. In other words, the terminal 410 measures the signal strength of each reference signal transmitted by the base station 400, selects a beam direction having a strongest signal strength from the measured signal strengths, and feeds back an index of the selected beam or an index of the selected reference signal to the base station 400.

In a second alternative for step 403, instead of only selecting the preferred beam having the strongest signal strength, the terminal 410 may select the best N beams and feed back an index of the selected N beams or an index of the selected N reference signals to the base station 400. The terminal 410 may also include at least one of the corresponding measurements of the N reference signals, an indication of a preferred beam or reference signal, a ranking of the selected N beams and a ranking of the selected N signals, etc. In this case, the base station 400 may use the best of the N beams. Here, N may be a fixed number or N may be the number of reference signals that have a signal strength that is greater than a threshold.

Herein, the above alternative implementations for step 403 of the beam obtain procedure will correspond to respective alternative implementations for the beam change procedure, which are described further below. In addition, the use of signal strength may be replaced by channel quality, etc. Steps 401 and 403 may be repeatedly performed according to a predetermined period. At this point, it is preferable that a period of a beam obtain procedure is set much longer than an HARQ retransmission period as described above.

The base station 400 initially transmits data to the terminal 410 in step 405. Here, an HARQ technique is applied to the data. At this point, for convenience in description, it is assumed that the terminal 410 fails to decode the initially transmitted data. The terminal 410 that has failed to decode the data transmits Non ACKnowledge (NACK) to the base station 400 in step 407. According to the HARQ technique, in the case where the NACK is transmitted, the base station 400 retransmits the data, and the terminal 410 improves reception performance via coupling of an initially transmitted signal and a retransmitted signal. Typically, the cause of the decoding failure is an erroneous selection of a signal modulation and encoding caused by a difference between an expected channel and an actual channel. Also, as described above with reference to FIG. 2, the cause of the decoding failure may be a beam selection error. Therefore, the base station 400 and the terminal 410 according to an exemplary embodiment of the present invention determine whether a beam selection error occurs before retransmission, and perform a beam change procedure when the beam selection error occurs.

The beam change procedure is a procedure for modifying a beam direction in a relatively simple manner as compared to the beam obtain procedure. During the beam change procedure, replacement or addition of a beam is made. Even when a beam obtain procedure period does not elapse, a reference signal may be transmitted every frame for a different purpose or a different terminal. Therefore, the terminal 410 may determine a preferred beam every frame using the reference signals for the different purpose or the different terminal, and determine whether the beam selection error occurs. The base station 400 may then replace or add a beam direction for the terminal 410. The particular implementation of the beam change procedure corresponds to respective implementations of the beam obtain procedure. For convenience in explanation, it is assumed that the beam selection error has occurred.

The terminal 410, after determining that the beam selection error has occurred, transmits a beam change request to the base station 400 in step 409. The information included in the beam change request varies depending of the particular exemplary embodiment implemented. When the first alternative implementation of step 403 is performed, the beam change request may include at least one of information of a reselected transmission beam and information designating one of a change and an addition of a beam. Accordingly, the base station 400 may replace or add a beam direction for the terminal 410. As illustrated in FIG. 4, a beam-B may be replaced by a beam-C, or the beam-C may be added.

When the second alternative implementation of step 403 is performed, the beam change request is only an indication that a beam selection error has occurred. The indication that the beam selection error has occurred may be communicated using a small amount of information, such as one bit. In this case, the indication that the beam selection error has occurred may be included with another message, such as the NACK message 407, thereby reducing an amount of signaling. Also in this case, the base station 400 upon receiving the indication that the beam selection error has occurred may determine whether to replace or add a beam direction for the terminal 410 based on the measurements of the N reference signals received in step 403. As illustrated in FIG. 4, a beam-B may be replaced by a beam-C, or the beam-C may be added.

After performing the beam change procedure, the base station 400 retransmits data to the terminal 410 in step 411. At this point, an exemplary embodiment of the present invention assumes that the terminal 410 succeeds in decoding the data via coupling of an initially transmitted signal and a retransmitted signal. The terminal 410 that has succeeded in decoding the data transmits an ACKnowledge (ACK) to the base station 400 in step 413.

After that, when a period of the beam obtain procedure elapses, the base station 400 and the terminal 410 perform the beam obtain procedure. That is, the base station 400 sequentially transmits reference signals that apply respective transmission/reception beams, and the terminal 410 applies different reception beams to receive the reference signals in step 415. In addition, the terminal 410 selects a preferred beam or preferred N beams using the reference signals, and feeds back the preferred beam or the preferred N beams with their measurements and/or priority in step 417.

In the exemplary embodiment described with reference to FIG. 4, the beam change procedure is performed in the case where an HARQ retransmission is requested between beam obtain procedure periods and a beam selection error occurs. However, the exemplary embodiment illustrated in FIG. 4 cannot resolve a beam selection error that has occurred during an initial transmission. Therefore, according to another exemplary embodiment of the present invention, the beam change procedure may be performed in the case where a beam selection error occurs regardless of HARQ retransmission. In this case, improvement of initial transmission performance of data is expected. Another exemplary embodiment of the present invention is illustrated in FIG. 5.

FIG. 5 is a view illustrating signaling for a beam obtain procedure and a beam change procedure in a wireless communication system according to an exemplary embodiment of the present invention.

Referring to FIG. 5, a beam obtain procedure is performed in steps 501 and 503. In step 501, a base station 500 sequentially transmits reference signals that apply respective transmission/reception beams, and a terminal 510 applies different reception beams to receive the reference signals in step 501. That is, the base station 500 repeatedly transmits a plurality of reference signals while changing beam directions by the number of transmission/reception beams. Herein, there are alternative implementations for step 503 of the beam obtain procedure.

In a first alternative for step 503, the terminal 510 selects a preferred beam using the reference signals and feeds back information of the preferred beam in step 503. In other words, the terminal 510 measures a signal strength of each reference signal transmitted by the base station 500, selects a beam direction having a strongest signal strength from the measured signal strengths, and feeds back an index of the selected beam or an index of the selected reference signal to the base station 500.

In a second alternative for step 503, instead of only selecting the preferred beam having the strongest signal strength, the terminal 510 may select the best N beams and feed back an index of the selected N beams or an index of the selected N reference signals to the base station 500. The terminal 510 may also include at least one of the corresponding measurements of the N reference signals, an indication of a preferred beam or reference signal, a ranking of the selected N beams and a ranking of the selected N signals, etc. In this case, the base station 500 may use the best of the N beams. Here, N may be a fixed number or N may be the number of reference signals that have a signal strength that is greater than a threshold.

Herein, the above alternative implementations for step 503 of the beam obtain procedure will correspond to respective alternative implementations for the beam change procedure, which are described further below. In addition, the signal strength may be replaced by channel quality, etc. Steps 501 and 503 may be repeatedly performed according to a predetermined period. At this point, it is preferable that a period of a beam obtain procedure is set much longer than an HARQ retransmission period as described above.

After the beam obtain procedure, but before a beam obtain procedure period elapses, the terminal 510 may detect the occurrence of a beam selection error. That is, a reference signal may be transmitted by the base station 500 every frame for a different purpose or a different terminal. Therefore, the terminal 510 may determine a preferred beam every frame using the reference signals for the different purpose or the different terminal, and determine whether the beam selection error occurs. The base station 500 may then replace or add a beam direction for the terminal 510. The particular implementation of the beam change procedure corresponds to respective implementations of the beam obtain procedure. For convenience in explanation, it is assumed that the beam selection error has occurred.

The terminal 510, after determining that the beam selection error has occurred, transmits a beam change request to the base station 500 in step 505. The information included in the beam change request varies depending of the particular exemplary embodiment implemented. When the first alternative implementation of step 503 is performed, the beam change request may include at least one of information of a reselected transmission beam and information designating one of a change and an addition of a beam. Accordingly, the base station 500 replaces or adds a beam direction for the terminal 510. As illustrated in FIG. 5, a beam-B may be replaced by a beam-C, or the beam-C may be added.

When the second alternative implementation of step 503 is performed, the beam change request is only an indication that a beam selection error has occurred. The indication that the beam selection error has occurred may be communicated using a small amount of information, such as one bit. In this case, the indication that the beam selection error has occurred may be included with another message so as to reduce an amount of signaling. Also in this case, the base station 500 upon receiving the indication that the beam selection error has occurred may determine whether to replace or add a beam direction for the terminal 510 based on the measurements of the N reference signals received in step 503. As illustrated in FIG. 5, a beam-B may be replaced by a beam-C, or the beam-C may be added.

After that, when a period of the beam obtain procedure elapses, the base station 500 and the terminal 510 perform a beam obtain procedure. That is, the base station 500 sequentially transmits reference signals that apply respective transmission/reception beams, and the terminal 510 applies different reception beams to receive the reference signals in step 507. The terminal 510 selects a preferred beam or preferred N beams using the reference signals and feeds back the preferred beam or the preferred N beams with their measurements and/or priority in step 509.

Hereinafter, operations and constructions of a terminal and a base station that perform beam-forming are described in more detail with reference to the drawings.

Figure 6:
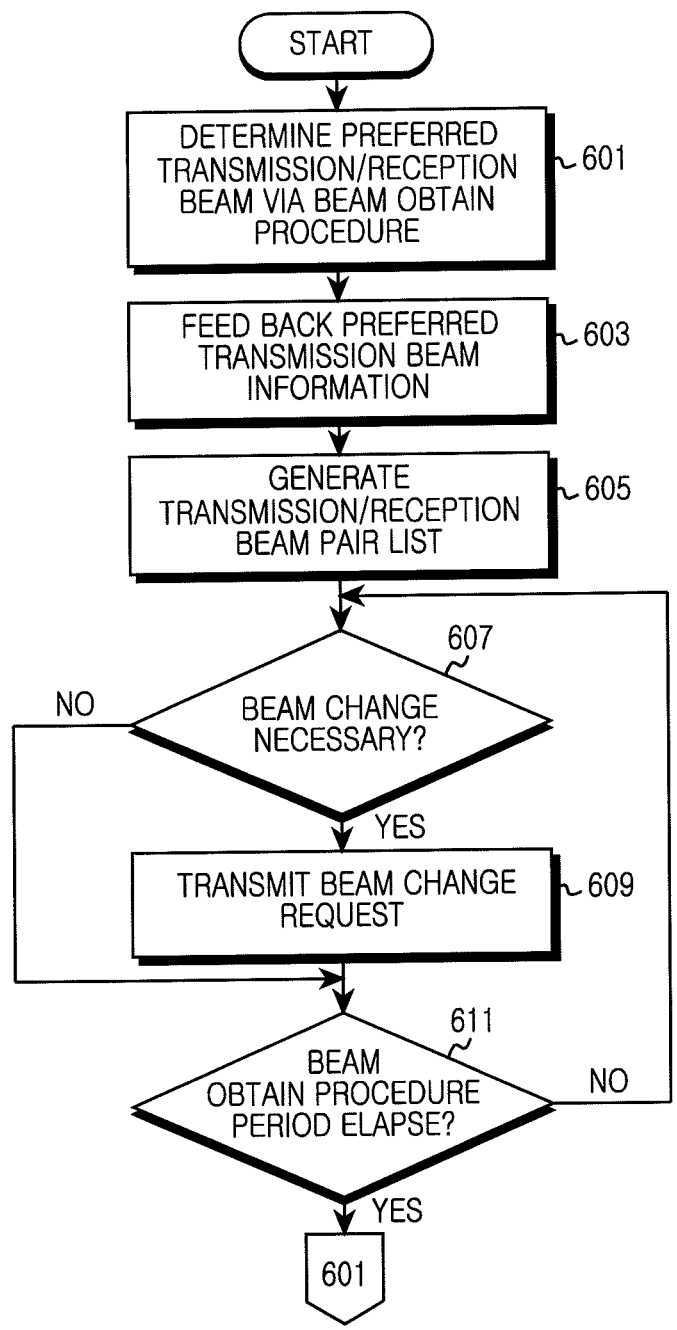
FIG. 6 is a flowchart illustrating a procedure for operating a terminal in a wireless communication system according to an exemplary embodiment of the present invention.

FIG. 6 is a flowchart illustrating a procedure for operating a terminal in a wireless communication system according to an exemplary embodiment of the present invention.

Referring to FIG. 6, the terminal determines a preferred transmission/reception beam or preferred N transmission beams for the preferred reception beam via a beam obtain procedure in step 601. The beam obtain procedure is periodically performed according to a predetermined time interval. More specifically, the terminal sequentially receives reference signals that apply different transmission beams from the base station, and applies reference signals to which the same transmission signal has been applied to different reception beams. Through this, the terminal determines a preferred transmission/reception beam pair or preferred N transmission beams for the preferred reception beam. Accordingly, the terminal applies the preferred reception beam to a downlink signal from the base station.

After determining the preferred transmission/reception beam pair or preferred N transmission beams for the preferred reception beam, the terminal proceeds to step 603 to feed back preferred transmission beam information to the base station. Since a reception beam is used by the terminal, the information indicating the preferred reception beam is not fed back. Herein, there are alternative implementations for feeding back the information indicating the preferred transmission beam. In a first alternative for feeding back the information indicating the preferred transmission beam, the information indicating the preferred transmission beam may include an index of the preferred beam or an index of the reference signal corresponding to the preferred beam. In a second alternative for feeding back the information indicating the preferred transmission beam, the information indicating the preferred N transmission beams may include an index of the preferred N beams or an index of the N reference signals corresponding to the preferred N beams. The information indicating the preferred N transmission beams may also include at least one of the corresponding measurements of the N reference signals, an indication of a preferred beam or reference signal, a ranking of the selected N beams and a ranking of the selected N signals, etc. In this case, the base station may use the best of the N beams as the preferred transmission beam. Here, N may be a fixed number or N may be the number of reference signals that have a signal strength that is greater than a threshold. Herein, the above alternative implementations for feeding back the information indicating the preferred transmission beam will correspond to respective alternative implementations for requesting a transmission beam change, which are described further below.

The terminal proceeds to step 605 to generate a transmission/reception beam pair list. The transmission/reception beam pair list represents results of selecting a reception beam maximizing received signal strength with respect to each transmission beam. For example, the transmission/reception beam pair list may be configured as shown in Table 2. That is, since a reception beam of the terminal typically has a wider beam than a transmission beam of the base station, a relationship between the reception beam and the transmission beam may be 1: plurality. In other words, with respect to one reception beam, a plurality of preferred transmission beams may exist. Step 605 may be performed prior to step 603 or simultaneously with steps 601 or 603.

The terminal proceeds to step 607 to determine whether a beam change is required. A condition under which the beam change is performed may be different depending on a specific exemplary embodiment implemented. For example, if the exemplary embodiment described above with reference to FIG. 4 is implemented, that is, in the case where decoding of data to which the HARQ technique has been applied fails, and simultaneously, a beam selection error occurs, the terminal may determine that the beam change is required. For another example, if the exemplary embodiment described with reference to FIG. 5 is implemented, that is, in the case where only the beam selection error occurs, the terminal may determine that the beam change is required.

To determine whether the beam selection error occurs, the terminal may use reference signals other than reference signals used for the beam obtain procedure of the terminal. For example, the terminal newly generates a transmission/reception beam pair list using reference signals other than the reference signals used for the beam obtain procedure of the terminal, searches for a beam pair having a strongest signal strength among transmission/reception beam pairs including the preferred reception beam selected in advance, and when a beam pair having the strongest signal strength is found that is different from the preferred transmission/reception beam pair determined via the beam obtain procedure, determines that the beam selection error occurs. For another example, in the case where a preferred reception beam is applied, the terminal determines a transmission beam maximizing received signal strength again, and when the transmission beam is different from a preferred transmission beam determined via the beam obtain procedure, determines that the beam selection error occurs. In determining the occurrence of the beam selection error, though the transmission beam maximizing the received signal strength is different from the preferred transmission beam determined via the beam obtain procedure, when signal strength of a case that applies the transmission beam determined via the beam obtain procedure is greater than or equal to a threshold, the terminal may determine that a beam selection error has not occurred. That is, a condition that signal strength in a case of applying a transmission beam determined via the beam obtain procedure is less than the threshold may be added as a condition under which the beam selection error occurs.

When the beam change is required, the terminal proceeds to step 609 to transmit a beam change request to the base station. The information included in the beam change request varies depending of the particular exemplary embodiment implemented. When the first alternative for feeding back the information indicating the preferred transmission beam is implemented, the beam change request may include at least one of information of a reselected preferred transmission beam and information designating one of a change and an addition of a beam. At this point, the terminal reselects a transmission beam in the range where a preferred reception beam is the same. That is, the terminal reselects a transmission beam maximizing received signal strength as a preferred transmission beam while the preferred reception beam determined in step 601 is applied.

When the second alternative for feeding back the information indicating the preferred transmission beam is implemented, the beam change request is only an indication that a beam selection error has occurred. The indication that the beam selection error has occurred may be communicated using a small amount of information, such as one bit. In this case, the indication that the beam selection error has occurred may be included with another message, such as the NACK message, thereby reducing an amount of signaling.

The terminal proceeds to step 611 to determine whether a period of a beam obtain procedure elapses. That is, the beam obtain procedure is periodically performed according to a predetermined time interval. When the period of the beam obtain procedure does not elapse, the terminal returns to step 607. When the period of the beam obtain procedure elapses, the terminal returns to step 601 to perform the beam obtain procedure again.

Figure 7:
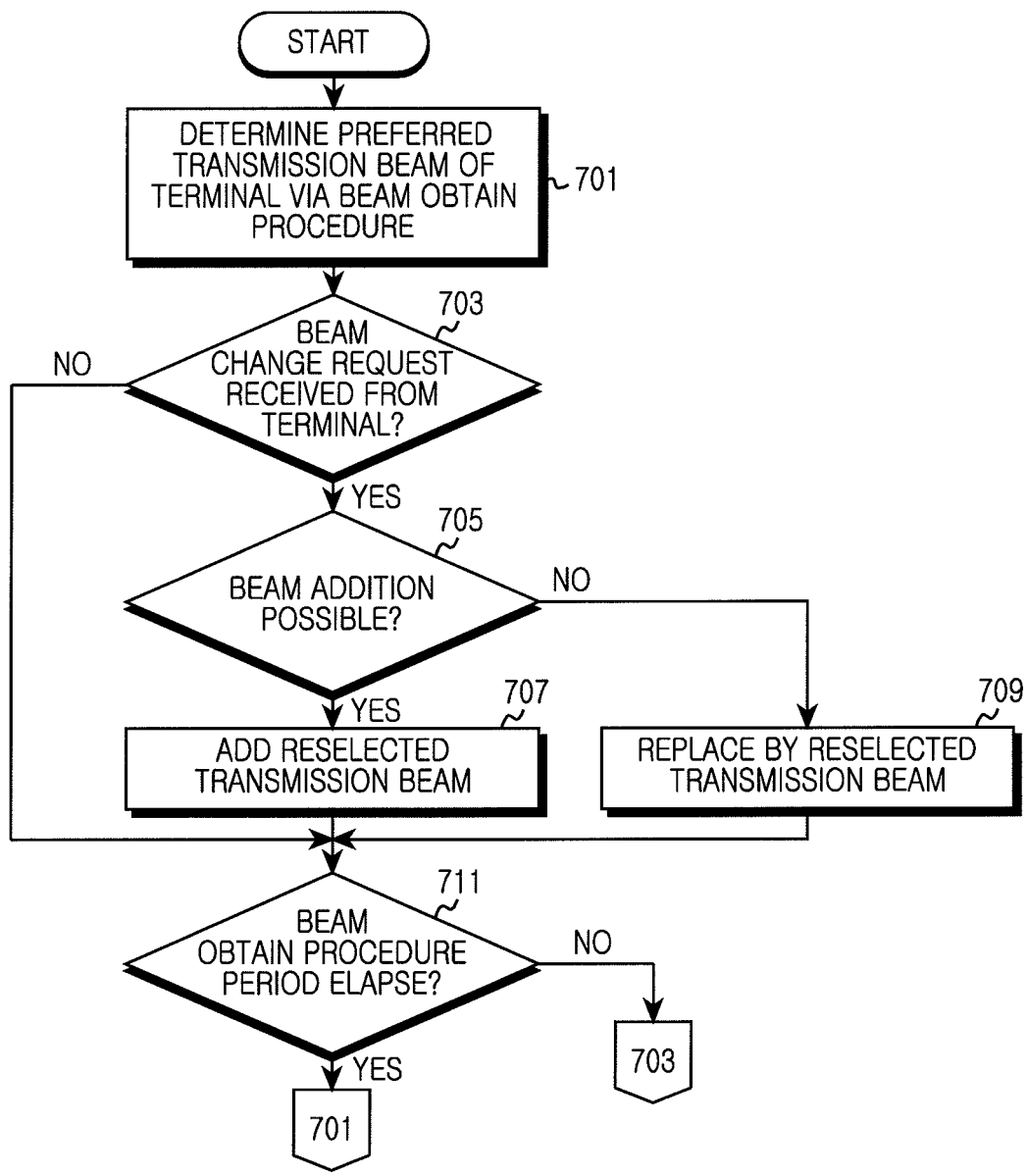
FIG. 7 is a flowchart illustrating a procedure for operating a base station in a wireless communication system according to an exemplary embodiment of the present invention.

FIG. 7 is a flowchart illustrating a procedure for operating a base station in a wireless communication system according to an exemplary embodiment of the present invention.

Referring to FIG. 7, the base station determines a preferred transmission beam of a terminal via a beam obtain procedure in step 701. The beam obtain procedure is periodically performed according to a predetermined time interval. Specifically, the base station sequentially transmits reference signals that apply different transmission beams, and receives preferred transmission beam information from the terminal. In an exemplary implementation, the preferred transmission beam information may include an index of a beam preferred by the terminal or an index of a reference signal corresponding to a beam preferred by the terminal. Accordingly, the base station identifies the preferred transmission beam based on the preferred transmission beam information and applies the preferred transmission beam to a downlink signal toward the terminal.

In another exemplary implementation, the preferred transmission beam information may include an index of N beams preferred by the terminal or an index of N reference signals corresponding to beams preferred by the terminal. The preferred transmission beam information may also include at least one of corresponding measurements of the N reference signals taken by the terminal, an indication of a beam or reference signal preferred by the terminal, a ranking of the N beams by the terminal, a ranking of the selected N signals by the terminal, etc. Here, N may be a fixed number or N may be the number of reference signals having a signal strength as measured by the terminal that is greater than a threshold. Accordingly, the base station identifies the preferred transmission beam based on the preferred transmission beam information and applies the preferred transmission beam to a downlink signal toward the terminal.

The base station proceeds to step 703 to determine whether a beam change request is received from the terminal. In one embodiment, the beam change request is a signal informing that the transmission beam preferred by the terminal changes, and may include at least one of information of a reselected preferred transmission beam and information designating change/addition of a beam. In another embodiment, the beam change request is an indication that a beam selection error has occurred. The indication that the beam selection error has occurred may be communicated using a small amount of information, such as one bit. In this case, the indication that the beam selection error has occurred may be included with another message, such as a NACK message, thereby reducing an amount of signaling.

Here, whether the base station is restrained in designating change/addition of a beam of the terminal may change depending on a specific embodiment implemented. Even though the base station is restrained in designating change/addition of a beam of the terminal, when addition of a beam is impossible due to resource shortage of the base station, only beam change is allowed. In addition, in the case where information designating change/addition of the beam is not included, the base station may determine that addition of the beam is always possible with priority. When the beam change request is not received, the base station proceeds to step 711.

In contrast, when the beam change request is received, the base station proceeds to step 705 to determine whether beam addition is possible. Whether the beam addition is possible may be determined based on whether Radio Frequency (RF) resources of the base station are available. That is, to enable addition of the beam, the base station should have a plurality of RF chains, and should be able to additionally allocate at least one RF chain to a downlink signal toward the terminal. In addition or alternatively, the base station may determine whether beam addition is possible based on the preferred transmission beam information fed back from the terminal during the beam obtain procedure. If the addition of the beam is possible, the base station proceeds to step 707 to add a reselected preferred transmission beam to the preferred transmission beam determined in step 701. Here, the reselected preferred transmission beam may be the beam included in the beam change request or may be a beam determined by the base station based on the preferred transmission beam information fed back from the terminal during the beam obtain procedure. In contrast, if the addition of the beam is not possible, the base station proceeds to step 709 to replace the preferred transmission beam determined in step 701 with the reselected preferred transmission beam. Once again, the reselected preferred transmission beam may be the beam included in the beam change request or may be a beam determined by the base station based on the preferred transmission beam information fed back from the terminal during the beam obtain procedure.

The base station proceeds to step 711 to determine whether a period of a beam obtain procedure elapses. That is, the beam obtain procedure is periodically performed according to a predetermined time interval. When the period of the beam obtain procedure does not elapse, the base station returns to step 703. When the period of the beam obtain procedure elapses, the base station returns to step 701 to perform the beam obtain procedure again.

Figure 8:
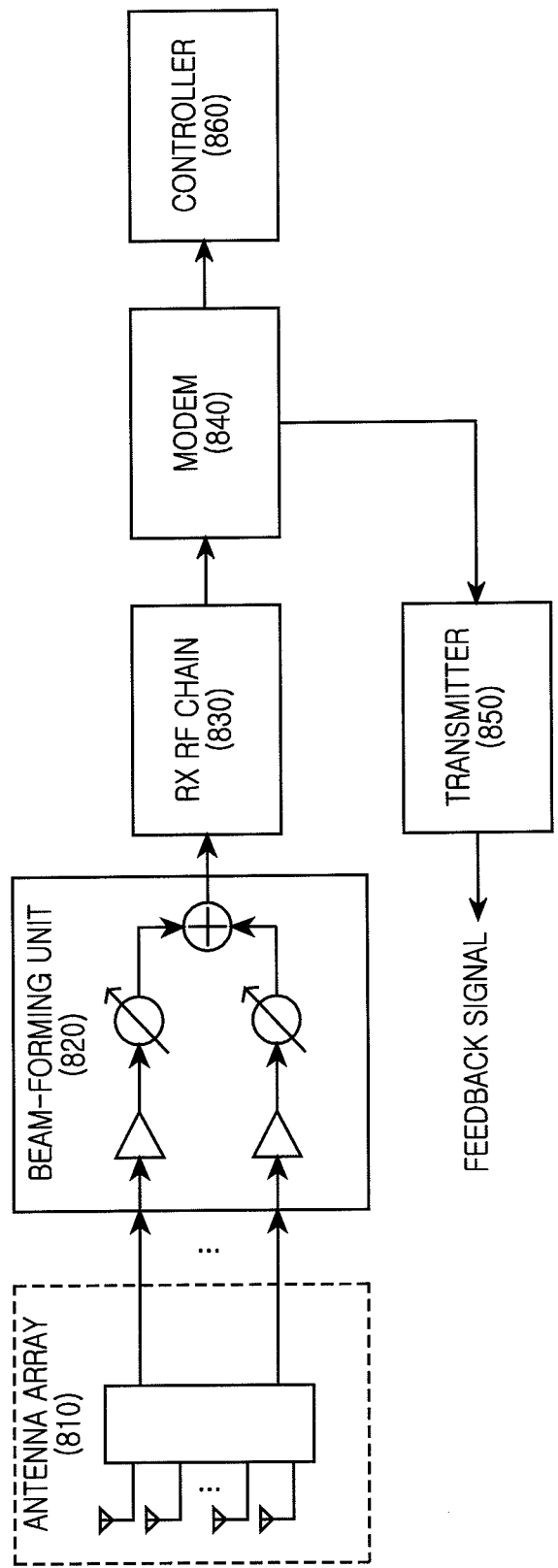
FIG. 8 is a block diagram illustrating a terminal in a wireless communication system according to an exemplary embodiment of the present invention.

FIG. 8 is a block diagram illustrating a terminal in a wireless communication system according to an exemplary embodiment of the present invention.

Referring to FIG. 8, the terminal includes an antenna array 810, a beam-forming unit 820, a reception RF chain 830, a modem 840, a transmitter 850, and a controller 860. According to exemplary embodiments of the present invention, the terminal may include additional and/or different components. Similarly, the functionality of two or more components may be integrated into a single component.

The antenna array 810 is an aggregate of a plurality of antennas, and includes a plurality of array elements. The beam-forming unit 820 performs reception beam-forming with respect to a signal received via a plurality of antennas forming the antenna array 810. For example, the beam-forming unit 820 includes a plurality of amplifiers, a plurality of phase shifters, and a signal adder. That is, the beam-forming unit 820 performs reception beam-forming by controlling and adding the phase of signals received via each of the plurality of antennas. The reception RF chain 830 converts an analog reception signal in an RF band into a baseband digital signal. For example, the reception RF chain 830 may include an amplifier, a mixer, an oscillator, an Analog-to-Digital Converter (ADC), and a filter. The antenna array 810, beam-forming unit 820, and beam-forming unit 820 may collectively be referred to as a receiver. Also, the receiver may vary depending on the particular implementation of the receiver. For example, the terminal may not include the beam-forming unit 820 and beam-forming unit 820.

The modem 840 performs a conversion function between a baseband signal and a bit line according to a physical layer standard of a system. For example, in an OFDM scheme, during data transmission, the modem 840 generates complex symbols by encoding and modulating a transmission bit line, maps the complex symbols to subcarriers, and then configures OFDM symbols via Inverse Fast Fourier Transform (IFFT) and Cyclic Prefix (CP) insertion. In addition, during data reception, the modem 840 divides baseband signals provided from the reception RF chain 830 on an OFDM symbol basis, recovers signals mapped to subcarriers by performing Fast Fourier Transform (FFT), and then recovers a reception bit line through demodulation and decoding. The transmitter 850 converts a transmission signal provided from the modem 840 into an RF signal to transmit the same to a base station. Though not shown specifically, the transmitter 850 includes a transmission RF chain, an antenna, etc.

The controller 860 controls an overall operation of the terminal. The controller 860 may perform or control to perform any of the operations described herein as being performed by the terminal. For example, the controller 860 generates transmission traffic and a message to provide the same to the modem 840, and reads a reception traffic packet and a message provided from the modem 840. More particularly, the controller 860 controls to perform the beam obtain procedure and the beam change procedure. An operation of the controller 860 for the beam obtain procedure and the beam change procedure is described below.

For the beam obtain procedure, the controller 860 sequentially receives reference signals that apply different transmission beams from the base station, and controls the beam-forming unit 820 to apply reference signals to which the same transmission beam has been applied to different reception beams. In addition, the controller 860 determines a transmission beam of the base station and a reception beam of the terminal that maximize received signal strength, that is, a preferred transmission/reception beam pair. Accordingly, the controller 860 generates preferred transmission beam information, and transmits the preferred transmission beam information to the base station via the modem 840 and the transmitter 850. After that, the controller 860 controls the beam-forming unit 820 to perform reception beam-forming using the preferred reception beam. The beam obtain procedure is periodically performed according to a predetermined time interval.

For the beam change procedure, after the beam obtain procedure, the controller 860 generates a transmission/reception beam pair list. In addition, the controller 860 determines whether a beam change is required before a period of the beam obtain procedure elapses. A condition under which the beam change is performed may change depending on a specific embodiment. For example, the condition includes a beam selection error occurrence, and may further include a decoding failure of data to which the HARQ technique has been applied. To determine whether the beam selection error occurs, the controller 860 may use different reference signals excluding a reference signal for the beam obtain procedure of the terminal. When the beam change is required, the controller 860 reselects a preferred transmission beam, and transmits a beam change request to inform the base station of the reselected preferred transmission beam. The beam change request may include at least one of information of the reselected preferred transmission beam and information designating change/addition of a beam. Alternatively, the beam change request may be an indication that the beam selection error has occurred and may be communicated using a small amount of information, such as one bit. In this case, the indication that the beam selection error has occurred may be included with another message, such as a NACK message, thereby reducing an amount of signaling. At this point, the controller 860 maintains the reception beam.

Figure 9:
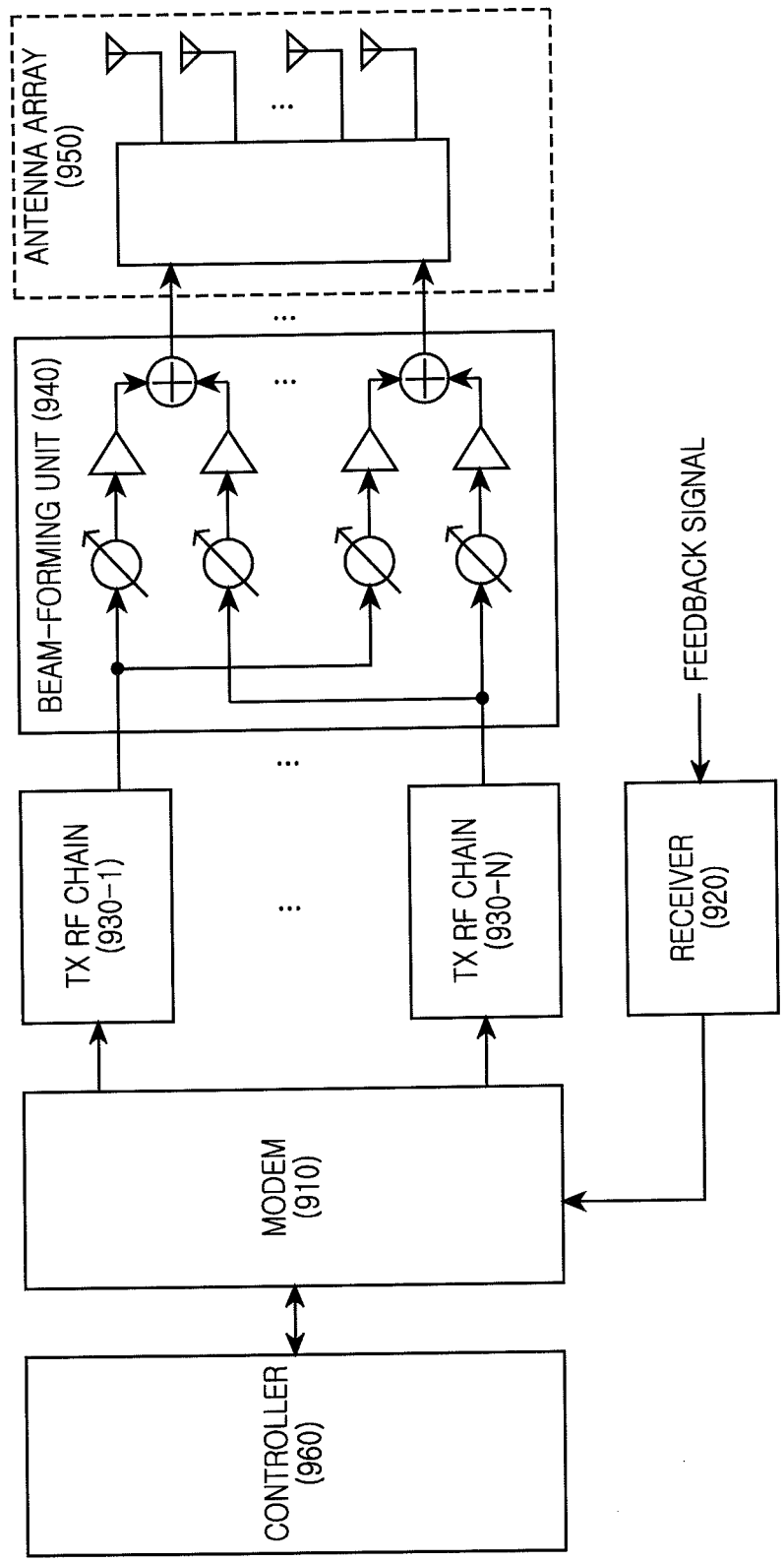
FIG. 9 is a block diagram illustrating a base station in a wireless communication system according to an exemplary embodiment of the present invention.

FIG. 9 is a block diagram illustrating a base station in a wireless communication system according to an exemplary embodiment of the present invention.

Referring to FIG. 9, the base station includes a modem 910, a receiver 920, a plurality of transmission RF chains 930-1 to 930-N, a beam-forming unit 940, an antenna array 950, and a controller 960. According to exemplary embodiments of the present invention, the base station may include additional and/or different components. Similarly, the functionality of two or more components may be integrated into a single component.

The modem 910 performs a conversion function between a baseband signal and a bit line according to a physical layer standard of a system. For example, in an OFDM scheme, during data transmission, the modem 910 generates complex symbols by encoding and modulating a transmission bit line, maps the complex symbols to subcarriers, and then configures OFDM symbols via IFFT and CP insertion. In addition, during data reception, the modem 910 divides baseband signals on an OFDM symbol basis, recovers signals mapped to subcarriers by performing FFT, and then recovers a reception bit line through demodulation and decoding. The receiver 920 converts an RF signal received from a terminal into a baseband digital signal. Specifically, though not shown, the receiver 920 includes an antenna, reception RF chain, etc.

The plurality of transmission RF chains 930-1 to 930-N convert baseband digital signal streams provided from the modem 910 to an RF analog signal. For example, each of the plurality of transmission RF chains 930-1 to 930-N may include an amplifier, a mixer, an oscillator, a Digital-to-Analog Converter (DAC), and a filter. The base station may simultaneously form transmission beams by the number of the plurality of transmission RF chains 930-1 to 930-N.

The beam-forming unit 940 performs beam-forming on transmission signals provided from the plurality of transmission RF chains 930-1 to 930-N. For example, the beam-forming unit 940 includes a plurality of phase shifters, a plurality of amplifiers, and a signal adder. That is, the beam-forming unit 940 divides a transmission signal provided from each of the plurality of transmission RF chains 930-1 to 930-N by the number of the plurality of antennas included in the antenna array 950, and controls the phase of each divided signal. In addition, the beam-forming unit 940 adds signals to be transmitted via the same antenna. The antenna array 950 is an aggregate of a plurality of antennas, includes a plurality of array elements, and radiates signals provided from the beam-forming unit 940 to an RF channel. The plurality of transmission RF chains 930-1 to 930-N, beam-forming unit 940, and antenna array 950 may collectively be referred to as a transmitter.

The controller 960 controls an overall operation of the base station. The controller 960 may perform or control to perform any of the operations described herein as being performed by the base station. For example, the controller 960 generates a transmission traffic packet and a message to provide the same to the modem 910, and reads a reception traffic packet and a message provided from the modem 910. More particularly, the controller 960 controls to perform a beam obtain procedure and a beam change procedure. An operation of the controller 960 for the beam obtain procedure and the beam change procedure is described below.

For the beam obtain procedure, the controller 960 controls the modem 910 to repeatedly transmit reference signals, and controls the beam-forming unit 940 to apply different transmission beams to the reference signals. In addition, the controller 960 determines a transmission beam preferred by a terminal based on preferred transmission beam information received via the receiver 920. After that, the controller 960 controls the beam-forming unit 940 to apply a transmission beam preferred by the terminal to a downlink signal toward the terminal. The beam obtain procedure is periodically performed according to a predetermined time interval.

For the beam change procedure, when a beam change request is received from the terminal via the receiver 920, the controller 960 determines whether beam addition is possible. To enable the addition of the beam, at least one of the plurality of transmission RF chains 930-1 to 930-N should be able to be additionally allocated to a downlink signal toward the terminal. In addition or alternatively, controller 960 may determine whether beam addition is possible based on the preferred transmission beam information received via the receiver 920 during the beam obtain procedure. When the addition of the beam is possible, the controller 960 adds a reselected preferred transmission beam included in the beam change request to the transmission beam preferred by the terminal. Here, the reselected preferred transmission beam may be the beam included in the beam change request or may be a beam determined by the controller 960 based on the preferred transmission beam information received via the receiver 920 during the beam obtain procedure. In contrast, when the addition of the beam is not possible, the controller 960 replaces the transmission beam preferred by the terminal by the reselected preferred transmission beam included in the beam change request. Once again, the reselected preferred transmission beam may be the beam included in the beam change request or may be a beam determined by the controller 960 based on the preferred transmission beam information received via the receiver 920 during the beam obtain procedure.

Exemplary embodiments of the present invention are described herein in the context of the base station using a transmission beam and the terminal using a reception beam. However, the present invention is not limited thereto. Exemplary embodiments of the present invention are equally applicable to the case where the terminal does not utilize a reception beam. In this case, instead of selecting beams pairs, transmission beams alone are selected.

Exemplary embodiments of the present invention may swiftly deal with transient or temporary beam mismatch phenomenon by additionally performing a beam change procedure corresponding to a beam selection error that occur before a next iteration of a beam obtain procedure that is periodically performed in a wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a receiving node in a wireless communication system, the method comprising:
   receiving, from a transmitting node, a data signal that is beamformed with a first transmission beam at the transmitting node and is beamformed with a reception beam at the receiving node;
   detecting that a beam error occurs; and
   transmitting, to the transmitting node, a message requesting to use a second transmission beam that is one of at least one transmission beam paired with the reception beam,
   wherein the reception beam and the first transmission beam are determined according to a periodic procedure based on a beam sweeping, and
   wherein the second transmission beam is determined according to a non-periodic procedure that is triggered by the beam error.

2. The method of claim 1, further comprising:
   receiving another data signal that is beamformed with the second transmission beam.

3. The method of claim 1, further comprising:
   receiving a first data signal that is beamformed with the first transmission beam and a second data signal that is beamformed with the second transmission beam.

4. The method of claim 1, further comprising:
   determining the second transmission beam using signals other than reference signals allocated for a the periodic procedure for the receiving node.

5. The method of claim 1, further comprising:
   determining the second transmission beam if a decoding of the data signal fails.

6. The method of claim 1, further comprising:
   determining, during the periodic procedure, the first transmission beam and the reception beam based on repetitive measurements of a plurality of reception beams and a plurality of transmission beams.

7. The method of claim 1, further comprising determining the second transmission beam without repetitive measurements of a plurality of reception beams in response to the detection of the beam error.

8. A method for operating a transmitting node in a wireless communication system, the method comprising:
   transmitting, to a receiving node, a data signal that is beamformed with a first transmission beam at the transmitting node and is beamformed with a reception beam at the receiving node; and
   receiving, from the receiving node, a message requesting to use a second transmission beam that is one of at least one transmission beam paired with the reception beam,
   wherein the reception beam and the first transmission beam are determined according to a periodic procedure based on a beam sweeping, and
   wherein the second transmission beam is determined according to a non-periodic procedure that is triggered by a beam error.

9. The method of claim 8, further comprising:
   transmitting another data signal that is beamformed with the second transmission beam.

10. The method of claim 8, further comprising:
    transmitting a first data signal that is beamformed with the first transmission beam and a second data signal that is beamformed with the second transmission beam.

11. An apparatus for a receiving node in a wireless communication system, the apparatus comprising:
    a receiver configured to receive, from a transmitting node, a data signal that is beamformed with a first transmission beam at the transmitting node and is beamformed with a reception beam at the receiving node;
    a controller configured to detect that a beam error occurs; and
    a transmitter configured to transmit, to the transmitting node a message requesting to use the second transmission beam that is one of at least one transmission beam paired with the reception beam,
    wherein the reception beam and the first transmission beam are determined according to a periodic procedure based on a beam sweeping, and
    wherein the second transmission beam is determined according to a non-periodic procedure that is triggered by the beam error.

12. The apparatus of claim 11, wherein the transceiver is further configured to receive another data signal that is beamformed with the second transmission beam.

13. The apparatus of claim 11, wherein the transceiver is further configured to receive a first data signal that is beamformed with the first transmission beam and a second data signal that is beamformed with the second transmission beam.

14. The apparatus of claim 11, wherein the controller is further configured to determine the second transmission beam using signals other than reference signals allocated for the periodic procedure for the receiving node.

15. The apparatus of claim 11, wherein the controller is further configured to determine the second transmission beam if a decoding of the data signal fails.

16. The apparatus of claim 11, wherein the controller is further configured to determine, during the periodic procedure, the first transmission beam and the reception beam based on repetitive measurements of a plurality of reception beams and a plurality of transmission beams.

17. The apparatus of claim 11, wherein the controller is further configured to determine the second transmission beam without repetitive measurements of a plurality of reception beams in response to the detection of the beam error.

18. An apparatus for operating a transmitting node in a wireless communication system, the apparatus comprising:
   a transmitter configured to:
      transmit, to a receiving node, a data signal that is beamformed with a first transmission beam at the transmitting node and is beamformed with a reception beam at the receiving node; and
   a receiver configured to receive, from the receiving node, a message requesting to use a second transmission beam that is one of at least one transmission beam paired with the reception beam,
   wherein the reception beam and the first transmission beam are determined according to a periodic procedure based on a beam sweeping, and
   wherein the second transmission beam is determined according to a non-periodic procedure that is triggered by a beam error.

19. The apparatus of claim 18, wherein the transmitter is further configured to transmit another data signal that is beamformed with the second transmission beam.

20. The apparatus of claim 18, wherein the transmitter is further configured to transmit a first data signal that is beamformed with the first transmission beam and a second data signal that is beamformed with the second transmission beam.

* * * * *